Aug. 18, 1942.     S. M. DEL CAMP     2,293,596
FASTENER AND FASTENER INSTALLATION
Filed July 20, 1940

Inventor:
Scipione M. DelCamp.
By John Todd
Att'y.

Patented Aug. 18, 1942

2,293,596

UNITED STATES PATENT OFFICE 2,293,596

FASTENER AND FASTENER INSTALLATION

Scipione M. Del Camp, Maywood, Ill., assignor to Cinch Manufacturing Corporation, Chicago, Ill., a corporation of Illinois Application July 20, 1940, Serial No. 346,614

5 Claims. (Cl. 173—324)

This invention relates to soldering lug fastener installations and is directed particularly to a combination including a supporting strip of insulating material and fastener members in the form of soldering lugs and mounting brackets of new and improved construction secured rigidly to the supporting strip.

One of the objects of my invention is to provide fastener members of simple and inexpensive construction which may be attached to a relatively narrow supporting strip in a way to effect an installation of minimum size.

Another object of my invention relates to fastener members constructed in a way to be rigidly anchored to a supporting strip.

Other objects and uses of my invention will be apparent from inspection of the drawing and specification hereinbelow set forth.

Referring to the drawing, in which I have illustrated preferred embodiments of my invention:

Figure 1:
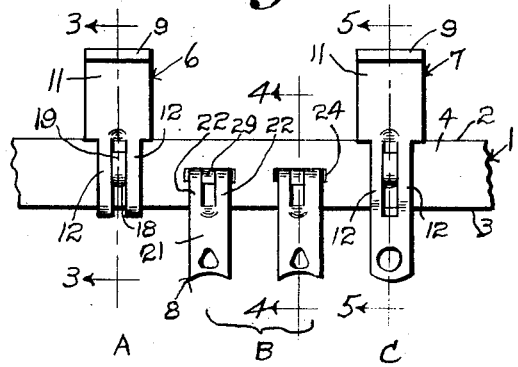
Fig. 1 is a front elevation of a terminal strip having three forms of my improved fastener members respectively indicated by the letters A, B and C secured thereto.

Referring to the drawing, I have shown a narrow supporting strip 1, which is preferably of insulating material, having (viewing Fig. 1) an upper narrow edge 2, a lower narrow edge 3, and front and rear sides 4 and 5. A pair of mounting brackets 6 and 7 are rigidly secured to the supporting strip. One or both of the mounting brackets may have a soldering terminal such as illustrated by the mounting bracket 7 for securing a lead wire thereto. A pair of fastener members 8 in the form of soldering lugs are secured to the strip, in my preferred installation, intermediate the mounting brackets 6 and 7 and constructed to permit lead wires to be soldered thereto. It is understood that although I have preferred to illustrate my invention by showing a supporting strip having a plurality of fasteners of different forms secured in assembly therewith, I do not wish to be limited to this particular combination of parts as it is obvious that the strip may carry one of the types of fasteners only in any desired number or any combination of types in any desired number or relation without departing from the scope and spirit of my invention.

Figure 3:
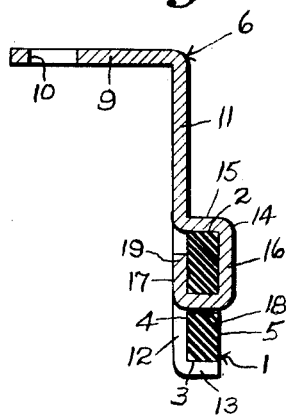
Fig. 3 is an enlarged section taken along the line 3—3 of Fig. 1.

Referring to the fastener member 6, indicated by the letter A (Fig. 1), I have shown one made entirely from one piece of sheet metal and providing a base 9 for engagement with a flat side of a panel (not shown), which may be the chassis of a radio set. The base 9 preferably provides an aperture 10 for receiving a rivet or the like to secure the base to the panel, but the base may be secured by any other suitable means such as spot-welding or a rivet formed integral therewith. The fastener member has a body 11 extending from one edge of the base 9 in perpendicular relation to the plane of the base. An attaching portion integral with an end of the body 11 away from the base 9 comprises, in my preferred form, a pair of laterally spaced arms 12—12. The arms 12—12 engage the side 4 of the strip 1 and provide angularly extending portions 13 at their ends which engage the lower edge 3 of the supporting strip (Fig. 3). A tongue or finger portion 14, integrally joined to the body portion 11 and formed from material of the attaching portion between the arms 12—12, has a laterally extending portion 15 in engagement with the edge 2 of the strip 1 when the parts are in assembly, a downwardly extending portion 16 (viewing Fig. 3) in spaced parallel relation to the arms 12 and engaging the side 5 of the strip 1, and an end portion 17 (Fig. 3) which engages the supporting strip through a small opening 18 therein, as shown most clearly in Fig. 3. The end 17 is bent over in a way to engage the edge or wall of the strip 1 adjacent the opening 18 and provides an outermost free end portion 19 in engagement with the side 4 of the strip 1 intermediate the arms 12—12. Thus the finger 14 cooperates with the arms 12 of the attaching portion to secure rigidly the bracket to the strip. The mounting bracket is formed from a relatively small piece of material and is adapted to be secured to a relatively narrow supporting strip.

Figures 4, 5:
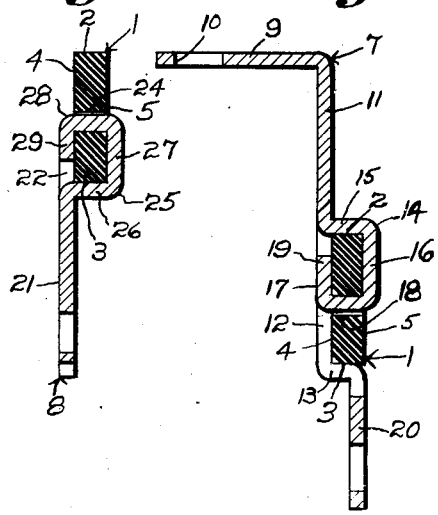
Fig. 4 is an enlarged section taken along the line 4—4 of Fig. 1.
Fig. 5 is an enlarged section taken along the line 5—5 of Fig. 1.

The mounting bracket 7 (indicated by the letter B, Fig. 1) is similar in form to the mounting bracket 6 but provides a terminal 20 which extends from the angularly extending portions 13 of the arms 12 downwardly beneath the supporting strip 1, as most clearly shown in Fig. 5

Figure 2:
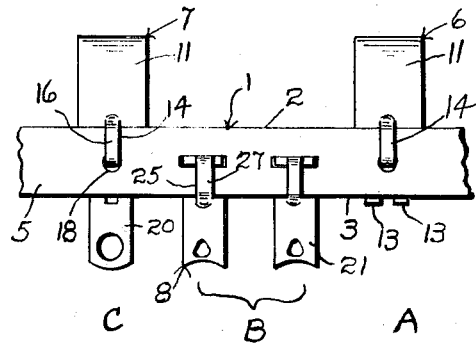
Fig. 2 is a rear view of the installation shown in Fig. 1.
Figure 6:
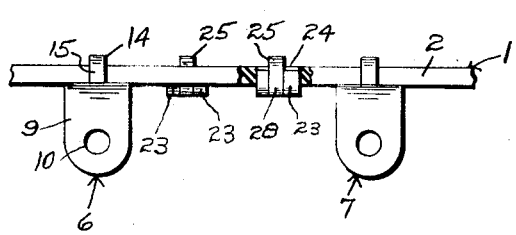
Fig. 6 is a top view of the installation shown in Figs. 1 and 2 with a portion of the supporting strip broken away to show more clearly the method by which the fasteners are secured to the supporting strip.

The fastener members 8 (indicated by B in Fig. 1) are in the form of soldering terminals and provide a body portion 21 shaped in any desired way to enable lead wires to be temporarily attached thereto before soldering. An attaching portion integral with the body comprises a pair of spaced parallel arms 22—22 engaging the side 4 of the strip 1. The arms 22—22 have angularly extending end portions 23 (Fig. 6) projecting into an elongated opening 24 of the strip 1 and engaging the edge or wall of the strip adjacent the opening. A finger portion 25 integral with the body portion 21 and preferably formed from material of the attaching portion between the arms 23—23 has a laterally extending portion 26 (Fig. 4) engaging the edge 3 of the strip, an upwardly extending portion 27 (viewing Figs. 2 and 4) engaging the side 5 of the strip, and an end portion 28 extending through the opening 24 and having an outermost free end portion 29 abutting the side 4 of the strip, as most clearly shown in Fig. 4. The end 28 of the finger 25 is disposed intermediate the arms 23—23, as most clearly shown in Fig. 6, and engages the wall of the strip adjacent the opening 24, as shown in Fig. 4. Thus the finger 25 cooperates with the arms 23—23 to secure the soldering lug rigidly to the strip 1.

As a result of my invention I have provided fasteners of simple construction capable of effecting a variety of uses and providing means readily adaptable for attachment to a narrow strip of insulating material.

Although I have illustrated and described preferred embodiments of my invention, I do not wish to be limited thereby because the scope of my invention is best defined by the following claims.

I claim:

1. In combination with an elongated supporting bar having spaced longitudinally disposed faces and a transverse opening therethrough intermediate said faces, of a sheet metal fastener strip disposed at right angles to said bar and attached to a plurality of its longitudinal faces; said fastener strip comprising a body portion and an integral looped attaching portion, said looped attaching portion being formed from a tongue cut from the body portion and having at least two angularly disposed faces offset laterally from the plane of the body, said looped portion also having an oppositely extending terminal free end extending past and beyond the plane of the fastener body, said angularly disposed faces embracing at least two outer faces of the bar, said terminal end being inserted throught the aperture of said bar, and being clenched against an opposed face of said bar, whereby the fastener strip is rigidly attached to said bar.

2. In combination with an elongated supporting bar having spaced longitudinally disposed faces and a transverse opening therethrough intermediate said faces; of a sheet metal fastener strip disposed at right angles to said bar and attached to a plurality of its longitudinal faces; said fastener strip comprising a body portion having one end bifurcated, an integral looped attaching portion formed from the tongue between said bifurcations and having at least two angularly disposed faces offset laterally from the plane of the body and said looped portion also having an oppositely extending terminal free and extending past and beyond the plane of the fastener body, said angularly disposed faces embracing at least two outer side faces of the bar, and said terminal end being inserted through the aperture of said bar and being clenched against an opposed face of said bar between said bifurcations whereby the fastener strip is rigidly attached to said bar.

3. In combination with an elongated supporting bar of rectangular cross section and formed with a transverse opening therethrough; of a sheet metal fastener strip disposed at right angles to said bar and embracing a plurality of its longitudinal faces, said attaching strip comprising a body portion being formed with a bifurcated portion engaging one of the side faces of the bar, and an attached tongue formed from the metal between said bifurcations, said tongue having a portion angularly disposed with reference to the body and engaging an edge face of said bar and another angularly disposed portion disposed substantially parallel to said bifurcations and engaging the opposite side face of said bar, the end portion of said tongue being disposed in angular relation to the last named portion and constituting a free end extending through the aperture of said bar and between and beyond the bifurcations of the body and being clenched to a position between said bifurcations and in engagement with the adjacent face of said bar.

4. In combination with an elongated supporting bar of rectangular cross section and formed with a transverse opening therethrough; of a sheet metal fastener strip disposed at right angles to said bar and embracing a plurality of its longitudinal faces, said attaching strip comprising a body portion being formed with a bifurcated portion engaging one of the side faces of the bar, and an attaching tongue formed from the metal between said bifurcations, said tongue having a portion angularly disposed with reference to the body and engaging an edge face of said bar and another angularly disposed portion disposed substantially parallel to said bifurcations and engaging the opposite side face of said bar, the end portion of said tongue being disposed in angular relation to the last named portion and constituting a free end extending through the aperture of said bar and between and beyond the bifurcations of the body and being clenched to a position between said bifurcations and in engagement with the adjacent face of said bar, the ends of said bifurcations being angularly disposed relative to the body portion and engaging the edge faces of said bar removed from said attaching tongue.

5. In combination with an elongated supporting bar of rectangular cross section and formed with a transverse opening therethrough; of a sheet metal fastener strip disposed at right angles to said bar and embracing a plurality of its longitudinal faces, said attaching strip comprising a body portion being formed with a bifurcated portion engaging one of the side faces of the bar, and an attaching tongue formed from the metal between said bifurcations, said tongue having a portion angularly disposed with reference to the body and engaging an edge face of said bar and another angularly disposed portion disposed substantially parallel to said bifurcations and engaging the opposite side face of said bar, the end portion of said tongue being disposed in angular relation to the last named portion and constituting a free end extending through the aperture of said bar and between and beyond the bifurcations of the body and being clenched to a portion between said bifurcations and in engagement with the adjacent face of said bar, a part of said bifurcated portion being angularly disposed relative to the body portion of said fastener and engaging an opposite edge face of said bar, said body terminating in an apertured extension beyond said angularly disposed bifurcated portion.

SCIPIONE M. DEL CAMP.